Figure 1:
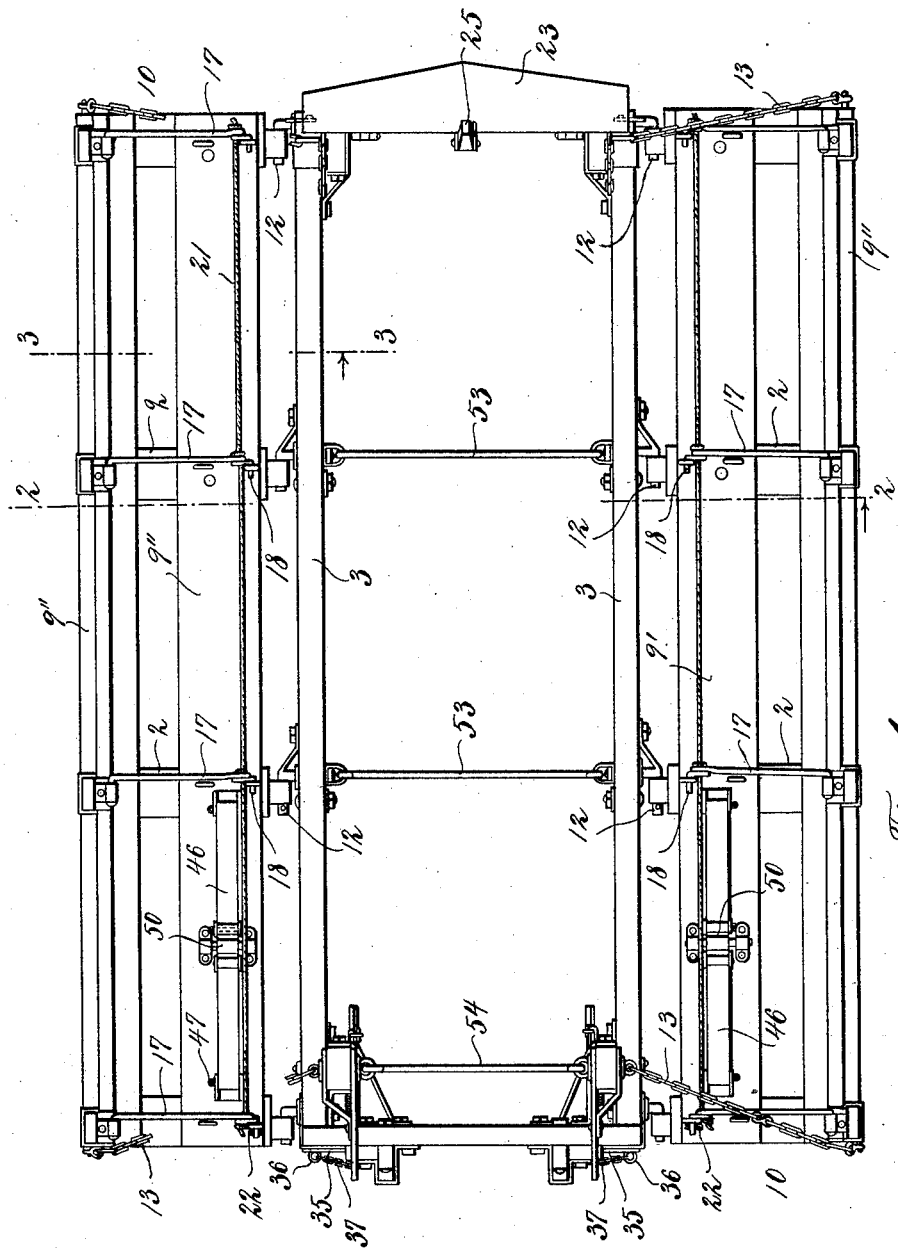

L. ONSRUD.
ATTACHMENT FOR WAGON BOXES.
APPLICATION FILED JUNE 2, 1911.

1,034,028.

Patented July 30, 1912.

3 SHEETS—SHEET 1.

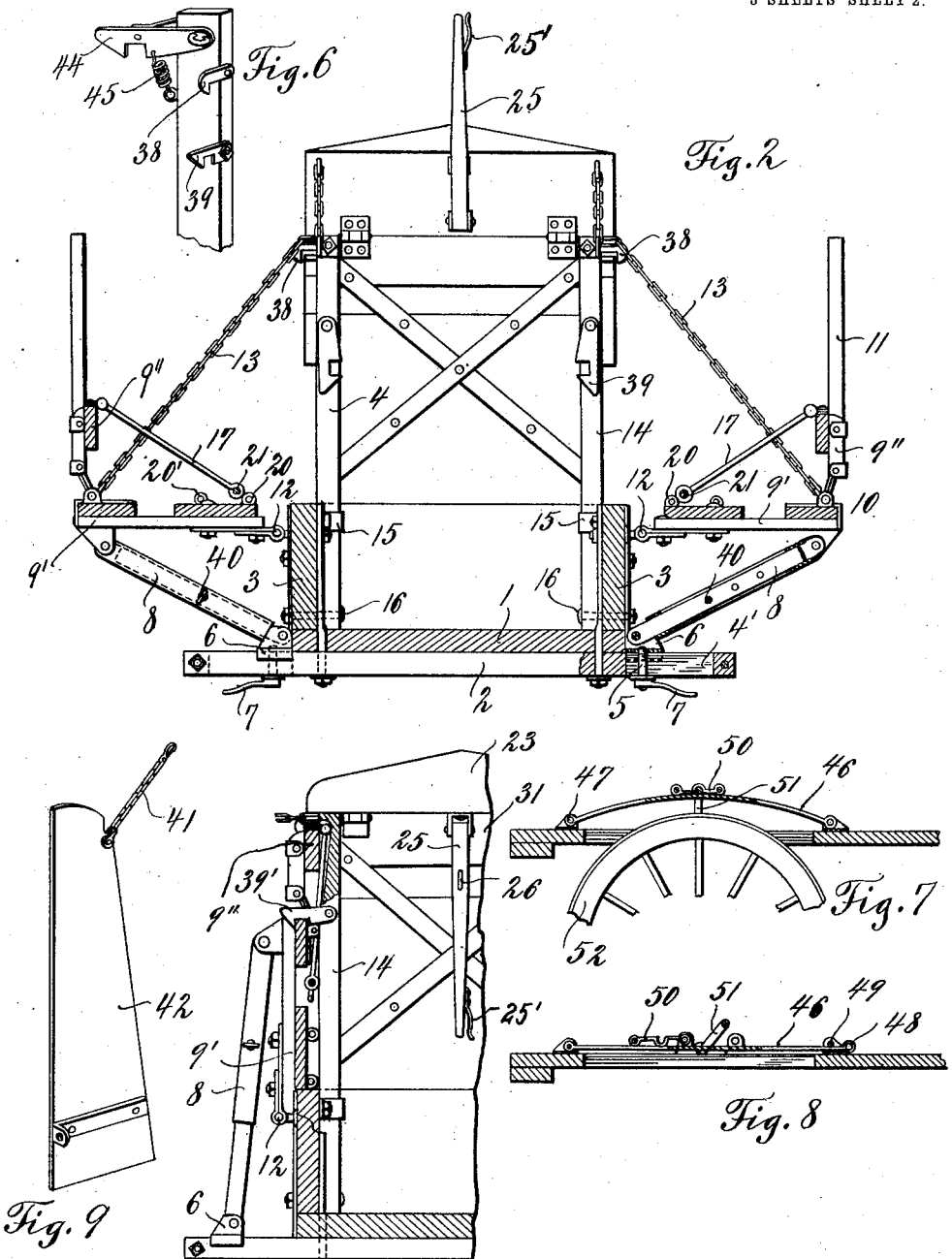

L. ONSRUD.
ATTACHMENT FOR WAGON BOXES.
APPLICATION FILED JUNE 2, 1911.
1,034,028.
Patented July 30, 1912.
3 SHEETS—SHEET 3.
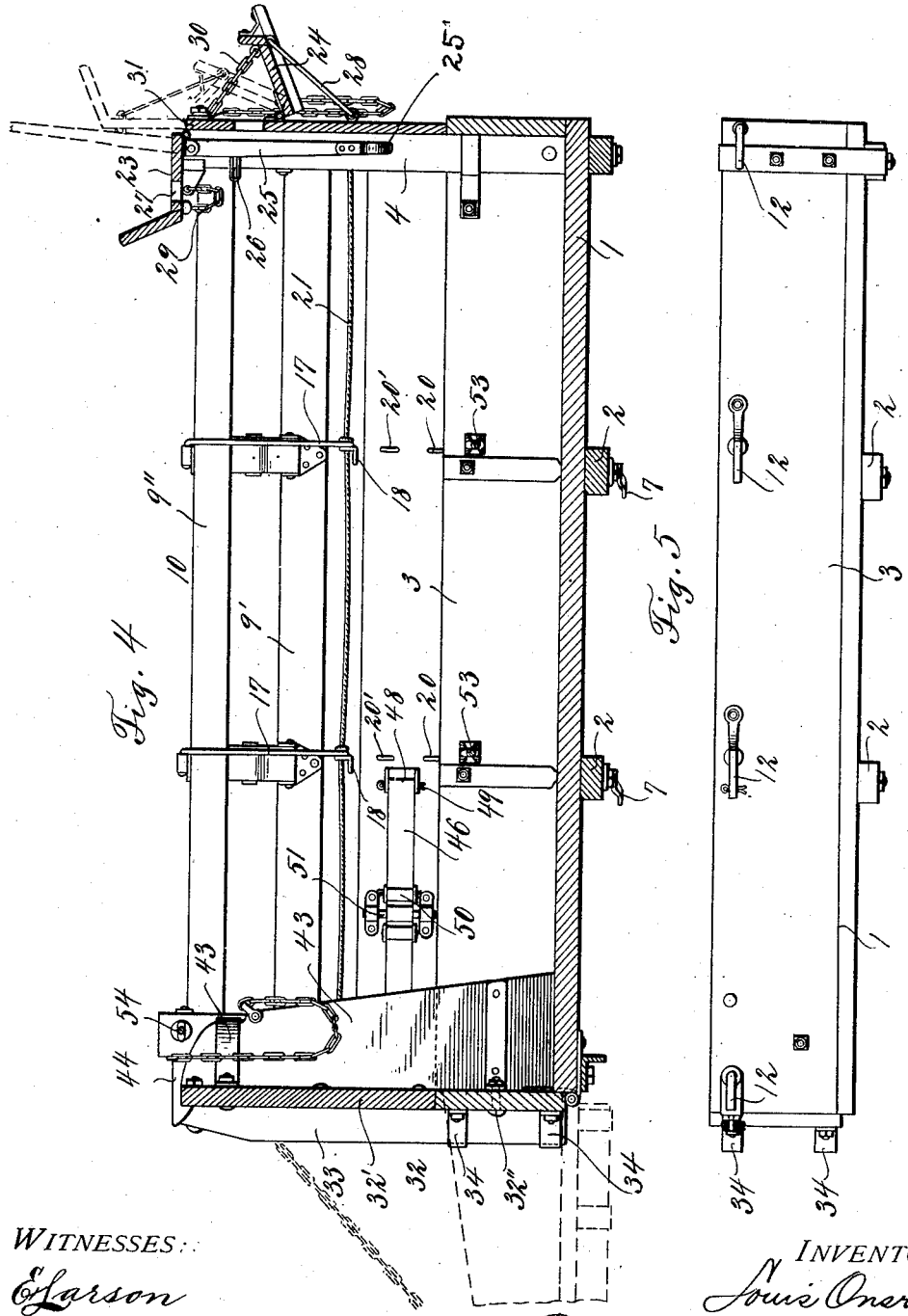
WITNESSES:
E. Larson
H. C. Gerber
INVENTOR
Louis Onsrud
BY Robb
Robb
Attorneys

UNITED STATES PATENT OFFICE.

LOUIS ONSRUD, OF WESTBY, WISCONSIN.

ATTACHMENT FOR WAGON-BOXES.

1,034,028.  Specification of Letters Patent.  Patented July 30, 1912.

Application filed June 2, 1911. Serial No. 630,946.

*To all whom it may concern:*

Be it known that I, LOUIS ONSRUD, a citizen of the United States, residing at Westby, in the county of Vernon and State of Wisconsin, have invented certain new and useful Improvements in Attachments for Wagon-Boxes, of which the following is a specification.

The present invention involves improvements in wagon boxes and includes primarily certain attachments therefor whereby the wagon body may be converted into a hay rack, may be utilized advantageously for the transportation of stock, and used in many other ways on a farm simply by the adjustment of the various parts according to the particular purpose for which the vehicle carrying the wagon body or box may be desired to be utlized.

The invention resides in peculiar combinations and arrangements of parts, the construction and operation of which will be more fully described hereinafter in connection with the accompanying drawings, in which—

Figure 1 is a top plan view of a wagon box or body embodying the essential features of the invention, the parts being adjusted to provide a hay rack; Fig. 2 is a transverse sectional view taken about on the line 2—2 of Fig. 1; Fig. 3 is a sectional view on the line 3—3 of Fig. 1, partly broken away; Fig. 4 is a longitudinal sectional view showing the arrangement of the parts when adjusted to permit of use of the wagon body for transporting stock or materials such as may be produced upon the farm; Fig. 5 is a side view of the wagon body, stripped of the attachments; Fig. 6 is a detail perspective view of one of the end standards of the box or body showing the hooks mounted thereon; Fig. 7 is a fragmentary sectional view showing more clearly one of the guards carried by the lower section of each side frame; Fig. 8 is a view similar to Fig. 7, the guard being shown in an inoperative position; Fig. 9 is a detail perspective view of one of the side plates supported by the end gate.

Specifically describing the invention and referring to the drawings, 1 denotes a wagon box which, in general form, is of ordinary construction, being supported upon transverse sills 2 and adapted to be mounted upon the running gear of a vehicle in any suitable manner. The sills 2 project at their ends beyond the sides 3 of the box 1 and the projecting portions are slotted as shown at 4′ to receive clamping bolts 5 which pass therethrough and connect with runners 6 slidable lengthwise of said sills. Lever-nuts 7 are screwed upon the lower ends of the bolts 5 and are adapted to be operated so as to hold the runners 6 at desired adjustments in the length of the projecting portions of the sills 2.

Pivotally connected with the runners 6 are the telescopic braces 8, a pair of which are preferably provided at each side of the wagon box 1. The upper ends of the braces 8 are pivotally connected to the upper portions of the lower sections 9′ of side frames 10, said frames embodying also the upper sections 9″ adapted to carry removably fitted stakes 11 for the usual purpose. The side frames 10 are pivotally connected at 12 to the upper portions of the sides 3 of the box 1 and said frames are adapted to assume vertical positions practically in alinement with the sides 3, as shown in Figs. 3 and 4, or they may be so adjusted by outward movement as to assume the positions shown in Figs. 1 and 2 whereupon they permit of convenient use of the invention as a hay-rack. When the frames 10 have been moved outwardly to the positions shown in Figs. 1 and 2, they are supported primarily by means of chains or flexible connections 13, the upper ends of which are attached to the upper end portions of end standards 14, two of which are preferably removably mounted at opposite ends of the box 1. The lower portions of the standards 14 are received by keepers 15 and detachably secured to the sides 3 by fastening bolts 16. The lower ends of the chains 13 are connected to the upper portions of the lower sections 9′ of the side frames 10. To hold the upper sections 9″ of the frames 10 in proper positions for use of the invention as a hay-rack, it is contemplated to provide a plurality of hook rods 17 pivotally connected at their upper ends to the sections 9″ and having hooks 18 at their lower ends adapted to engage with eyes 20 carried by the lower portions of the sections 9′ of the side frames.

The various hook rods 17 are connected together at their free or hook end portions by means of a flexible member or rope 21 and may therefore be simultaneously pulled into engagement with their respective eyes 20, and when once engaged therewith are held in such engagement by means of a cotter-pin 22 which passes through an opening in the hook of one of the end hook rods 17, after said hook has been engaged with its eye 20, this being shown most clearly in Fig. 1 of the drawings.

When the parts of the invention are adjusted to provide a hay-rack, as above described, the seat 23 which is normally supported on the upper ends of a pair of standards 4, is raised to a vertical position, as shown in dotted lines in Fig. 4, and in full lines in Fig. 2. The foot rest 24 at the front end of the vehicle body is also raised into the dotted line position in Fig. 4 when the parts are adjusted as a hay-rack, and the seat 23 and rest 24 are held in the positions just described by means of the rein holding bar 25 pivoted to the under side of the seat. The bar 25 when raised into a vertical position to hold the parts 23 and 24 in corresponding positions is adapted to carry a staple 26 supported thereby through the opening 27 in the bottom of the seat, said staple being then engaged by the hook 28 which is pivoted to the under side of the rest 24. At its upper end, the bar 25 may have any suitable guide or retaining means, such as shown at 25', for engaging the reins leading to the draft animals by which the vehicle carrying the box 1 and associated parts is drawn. The upward movement of the seat 23 is limited by means of chains or similar members 29 and the lower movement of the foot rest 24 is limited and said rest supported by similar chains 30 connected thereto and with a transverse bar 31 carried by two of the standards 4 at the front end of the box 1.

An end gate 32 is provided and is pivoted to the rear end of the bottom of the box 1, said end gate being made in two sections, 32' and 32''. The section 32' has vertical cleats 33 attached thereto and adapted to project at their lower ends into keepers 34 on the outer side of the lower section 32''. Hasp plates 35 project laterally from the lower section of the end gate 32 and eyes 36 on the sides of the wagon body are adapted to project through said plates to receive pins which are carried by short chains 37, said pins locking the end gate closed when the parts are in the positions shown in Fig. 1. Ordinarily the end gate would be kept closed when the device is used as a hay-rack.

When it is desired to employ the invention for the purpose of transporting stock or material in bulk, under which circumstances it would be necessary to increase the capacity of the box 1, the parts would be adjusted as shown in Figs. 3 and 4, wherein the side frames 10 are arranged in vertical positions above the sides 3 of the box 1 and held in such positions by means of upper and lower hooks 38 and 39 respectively, which are adapted to engage over certain of the longitudinal boards or members from which the side frames 10 are made. Furthermore, the side frames are held in such vertical positions by suitable adjustment of the telescopic braces 8, the sections of said braces 8 being adapted to be held at predetermined adjustments by means of a pin 40 provided for each brace and arranged to pass through registering openings of the sections thereof.

When the parts are in the adjustment shown in Figs. 3 and 4, the runners 6 of the transverse sills are moved to the outer ends of said sills correspondingly adjusting the lower ends of the braces 8 and are thus secured at such adjustment by means of the members 7. When not used as a hay-rack, the seat 23 and rest 24 will, of course, be positioned as shown in Fig. 4, namely, so that the operator of the vehicle may be seated at the front end of the wagon box in the customary manner.

In the event it is desired to lower the end gate, this may be done, as shown by dotted lines in Fig. 4, and the chains 13 utilized to hold the side frames in the adjustment shown in Fig. 2 are swung rearwardly and connected with the short chains 41 normally attached to side plates 42.

The plates 42 are secured at their inner ends to the lower section of the end gate 32 and at their outer ends are adapted to move through loops 43 projecting inwardly from the upper section 32' of the end gate, the arrangements of the parts 42 and 43 being such that the section 32' of the gate may be extended somewhat without entirely disengaging said parts. Rearwardly extending hooks 44 at the upper ends of the rear standards 4 are adapted to engage over the upper extremity of the section 32' of the end gate to assist in holding said section positively closed. Springs 45 normally tend to pull the hooks 44 downwardly into engagement with the end gate.

Should the invention be employed with vehicle running gear comprising very large wheels that would extend upwardly through the parts of the side frames 10, a special guard 46 shown in Figs. 7 and 8 is utilized, the same consisting of a plate pivoted at one end at 47 to the side frame and having at its other end a loop 48 adapted to be detachably engaged by a pin 49. A pivoted plate 50 is secured to the upper side of the guard 46 and may be engaged over a yoke 51 in the manner shown in Fig. 7 in order to bow the guard 46 above a wheel, such as shown at 52. By releasing the parts in the manner shown in Fig. 8, the guard 46 will assume a flat position, this being the desired arrangement thereof when the side frames are vertically disposed.

Hook rods 53 are pivoted at one end to one side 3 of the box 1 and adapted for detachable connection at the other ends with the other side 3. Similar hook rods 54 connect the rear standards 4.

Having thus described the invention, what is claimed as new is:

In combination, a wagon box, side frames pivoted at their lower ends to the sides of the box, said frames comprising upper and lower sections pivotally connected together, brace means pivotally connected to the lower section of each side frame and to the box for supporting said side frames in positions in which they extend outwardly from the wagon box, or vertically and upwardly therefrom, hook rods pivotally connected at one end to the upper section of each side frame, members on the lower section of each side frame adapted to be engaged by said hook rods, and means for simultaneously pulling the hook rods into engagement with said members.

In testimony whereof I affix my signature in presence of two witnesses.

LOUIS ONSRUD.

Witnesses:
 LAWRENCE GRIMSRUD,
 OTTO J. HAGEN.

Copies of this patent may be obtained for five cents each, by addressing the "Commissioner of Patents, Washington, D. C."